United States Patent
Bhaktwatsalam et al.

(10) Patent No.: US 9,654,458 B1
(45) Date of Patent: May 16, 2017

(54) UNAUTHORIZED DEVICE DETECTION IN A HETEROGENEOUS NETWORK

(71) Applicant: Amazon Technologies, Inc., Seattle, WA (US)

(72) Inventors: Abhoy Bhaktwatsalam, Bothell, WA (US); Vivek Bhanu, Bothell, WA (US); Chris Higgins, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/494,527

(22) Filed: Sep. 23, 2014

(51) Int. Cl.
*H04L 29/06* (2006.01)

(52) U.S. Cl.
CPC .......... *H04L 63/08* (2013.01); *H04L 63/0876* (2013.01)

(58) Field of Classification Search
CPC ............................ H04L 63/08; H04L 63/0876
See application file for complete search history.

(56) References Cited

U.S. PATENT DOCUMENTS

| | | | | |
|---|---|---|---|---|
| 5,546,540 A * | 8/1996 | White | ..................... | H04L 12/46 370/254 |
| 2004/0028016 A1 * | 2/2004 | Billhartz | ............... | H04L 63/123 370/338 |
| 2004/0249916 A1 * | 12/2004 | Graves | ................ | H04L 41/0873 709/223 |
| 2007/0118567 A1 * | 5/2007 | Isokawa | ................ | H04L 63/145 |
| 2009/0172156 A1 * | 7/2009 | Yadav | ............... | H04L 29/12028 709/224 |
| 2010/0268818 A1 * | 10/2010 | Richmond | ............ | G06F 21/552 709/224 |
| 2013/0067571 A1 * | 3/2013 | Lee | ..................... | H04L 41/0681 726/22 |
| 2014/0068738 A1 * | 3/2014 | Harty | ..................... | G06F 21/73 726/7 |

OTHER PUBLICATIONS

C. Spurgeon, "Ethernet: The Definitive Guide", Ch. 4, O'Reilly Media, Feb. 2000.*

* cited by examiner

*Primary Examiner* — Robert Leung
(74) *Attorney, Agent, or Firm* — Baker & Hostetler LLP

(57) ABSTRACT

Techniques are disclosed for identifying an unauthorized device in a network environment that comprises a plurality of heterogeneous devices. In some embodiments, tests may be performed about a device, using information provided by the device, information about the device obtained from a neighboring device, or information about a placement of the device within a network topology. These tests may be used to determine whether a device is unauthorized for the network.

19 Claims, 11 Drawing Sheets

… (1)

UNAUTHORIZED DEVICE DETECTION IN A HETEROGENEOUS NETWORK

BACKGROUND

Preventing unauthorized, or "rogue," devices from accessing a company's network is of high importance. One way that this may be achieved is through physical security. Physical access to a datacenter may be restricted to authorized personnel, and even within a datacenter, particularly sensitive components may be further restricted physically. For instance, those computers in a datacenter that handle payment processing may be kept in locked cages, where only a subset of those who have access to a datacenter as a whole may open a locked cage.

Additionally, where all devices on a computer network are homogenous (e.g., they are all the same model of computer from the same manufacturer), automated systems may be established to determine whether an unauthorized device is present. For example, automated systems may be established to identify any device that differs from the make and model of all of the other otherwise homogenous devices on the network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
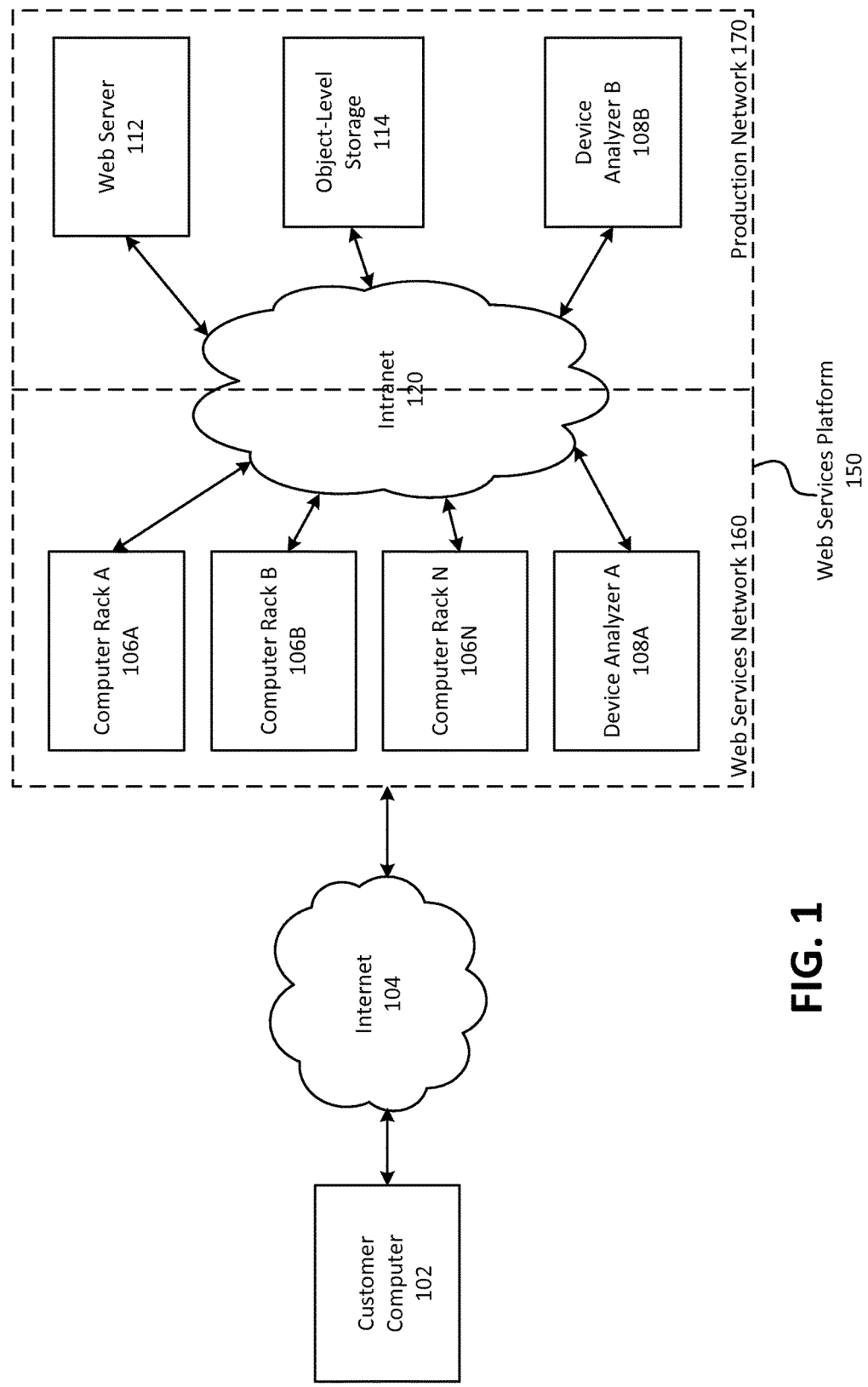
FIG. 1 depicts an example operating environment in which embodiments may be implemented.

Physical security against unauthorized devices connecting to a network, and automated systems that identify unauthorized devices in a homogenous environment each have problems. Physical security can be expensive, and may not catch all unauthorized devices that are added to a network. Additionally, when the size or number of datacenters to be secured grows, the number of potential attack points in which to insert an unauthorized device may also grow, and it may become impractical to solely rely on physical security against unauthorized devices when those unauthorized devices could be located in so many places.

Then, a problem with automated systems that identify unauthorized devices in a homogenous environment is that those systems do just that—they identify unauthorized devices only within a homogeneous environment. However, many networks and datacenters contain heterogeneous devices. For example, workers at the datacenter may use a variety of laptops from a variety of vendors, servers may be sourced from a variety of vendors, and even networking equipment, like switches, routers, firewalls, and load balancers, may be sourced from a variety of vendors. So, it is typical to have a heterogeneous environment rather than a homogeneous environment, and techniques designed specifically to address unauthorized devices in a homogeneous environment may not be applicable to addressing unauthorized devices in a heterogeneous environment.

One possible solution, then, is to provide for automated systems that identify unauthorized devices in a heterogeneous environment. The present disclosure contains several techniques for doing so, and these techniques may be used in concert to more accurately identify unauthorized devices. In some embodiments, there may be a management system that maintains a list of authorized devices on the network. A device's MAC address, or other identifier, may be compared against this list. This management system may also maintain an association between devices and where they should be located on a network (e.g., in a production intranet or in a corporate intranet) and use this information to determine if an otherwise authorized device is connected to the network in an unauthorized manner.

There may also be more sophisticated techniques to counteract more sophisticated rogue devices. For example, some of these techniques may leverage possessing knowledge of the entirety of the network being analyzed (e.g., one data center) to determine whether there is an unauthorized device (e.g., whether two devices report to have the same MAC address, where one is spoofing an authorized device's MAC address). Or, some of these techniques may leverage information about a device's neighbor to determine whether a rogue device is present. For example, two switches may be directly connected with a cable. If this connection is a half-duplex connection instead of a full-duplex connection, this may indicate that a rogue hub has been placed between the two switches, since switches usually communicate with each other via a full-duplex link, and hubs usually utilize a half-duplex link.

Other ways that devices may be validated as to whether they are authorized may relate to how they are inserted into a network. For example, a rack of devices may contain one switch and then a plurality of server computers that are generally of the same make and model. If the switch has more devices connected to it than there are spots for servers in the rack, this may indicate that a rogue device is also connected to the switch. Or, where one of the devices differs from its neighbors in the rack (though other racks may have different types of devices, which may distinguish this technique from techniques for identifying rogue devices in homogeneous environments), that may indicate that there is a rogue device in the rack.

In some embodiments that use a management system to maintain a list of authorized devices, it may be that there is a delay from when a device is added to a network and when a management system is updated to contain an indication that it is authorized. In these embodiments, there is a multi-stage process of identifying rogue devices, so as to not incorrectly identify a newly-added, authorized device as a rogue device. For example, where a device would otherwise be flagged as a rogue device because there is no entry for it in a management system, there may be a delay in doing so that corresponds to allowing for a time involved with adding an indication of the device in the management system. So, the device may be flagged at a low level when first encountered (e.g., "possibly rogue; possibly new; revisit"), and then flagged as actually rogue after a time period has elapsed from this first encounter and it is still not identified in the management system.

There are multiple ways that information indicative of a rogue device may be processed, and ways that a rogue device may be handled. For example, where multiple techniques are used in concert to identify a rogue device, each of these techniques may be used to assign a score indicative of whether the first device is rogue, and this score may be summed (this may be similar to a Bayesian technique for email spam filtering). Where the total score is above a predetermined threshold, this may be indicative of the device being rogue. Or, where any one of the techniques identifies the device as rogue, this may cause the system to identify the device as rogue regardless of whether all other techniques identify the device as authorized.

In some embodiments, a device identified as rogue may be flagged and an alert sent to an administrator to further investigate the device. In some embodiments, the device may be disconnected from the network (e.g., an Internet Protocol (IP) address assigned to it may be revoked, or its neighboring devices may be instructed not to communicate with it, or not to communicate along a communications link that the rogue device has access to) until an administrator investigates the device.

Figure 2:
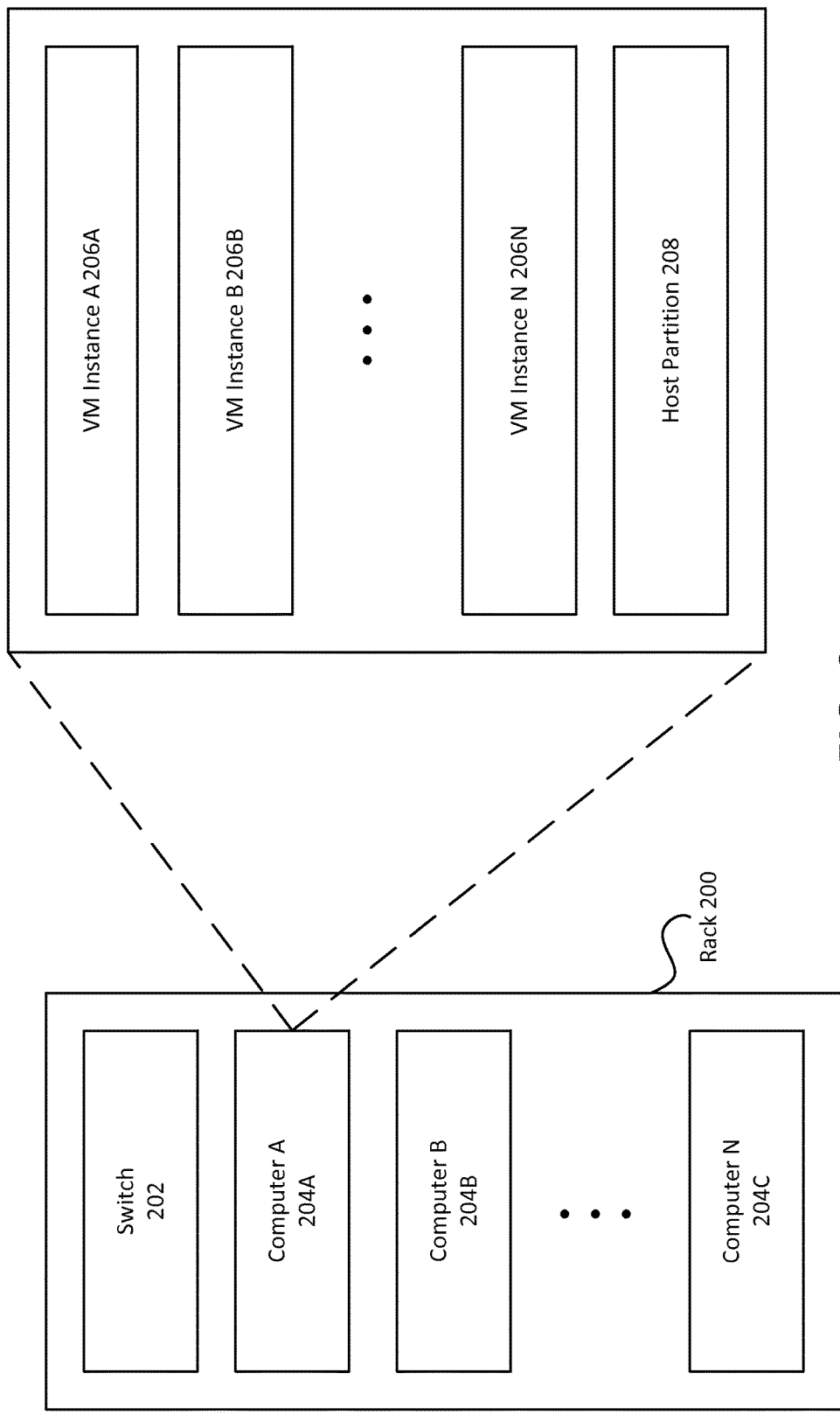
FIG. 2 depicts an example rack of computers with corresponding networking equipment that may be a part of the web services platform of FIG. 1.
Figure 3:
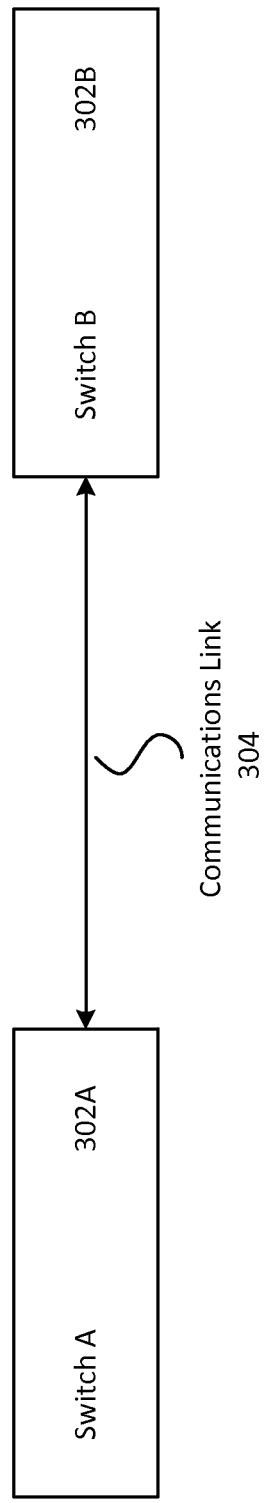
FIG. 3 depicts an example of two devices joined by a communications link, where information about each device may be determined from its neighboring device, and where these devices may be a part of the web services platform of FIG. 1.
Figure 9:
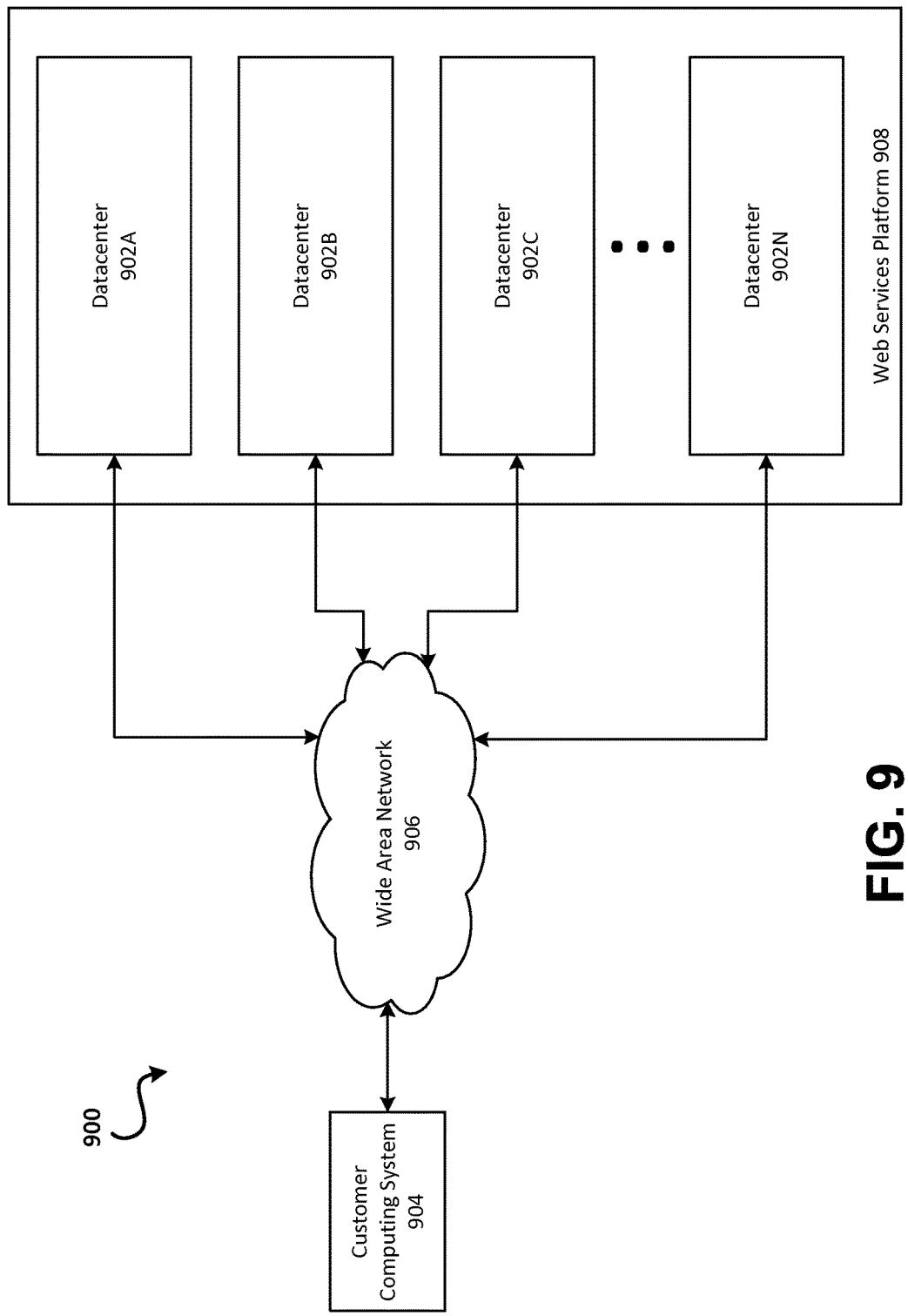
FIG. 9 depicts a web services platform, such as in FIG. 1, that comprises a plurality of datacenters.
Figure 10:
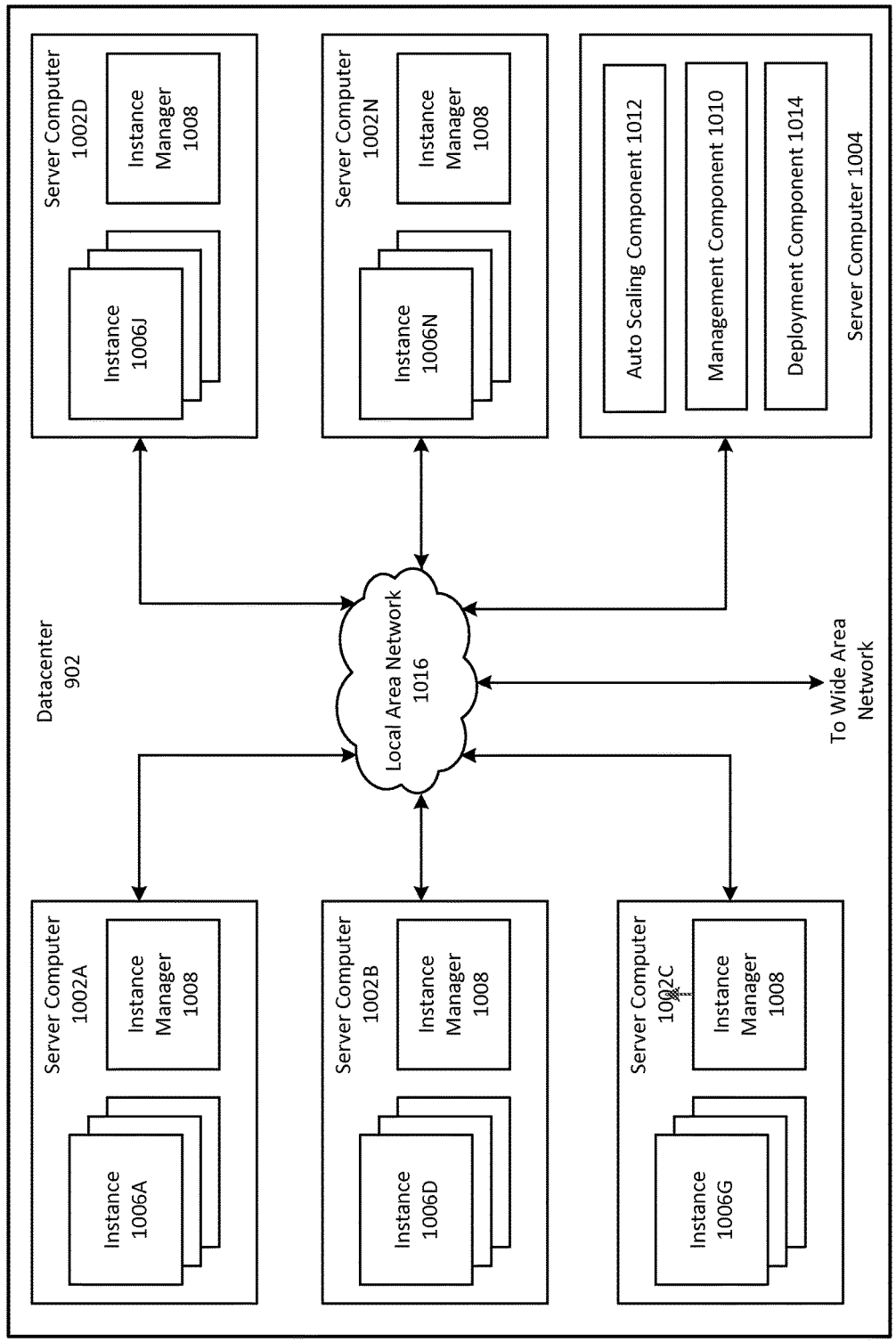
FIG. 10 depicts a datacenter, such as in FIG. 9, that comprises a plurality of computers.
Figure 11:
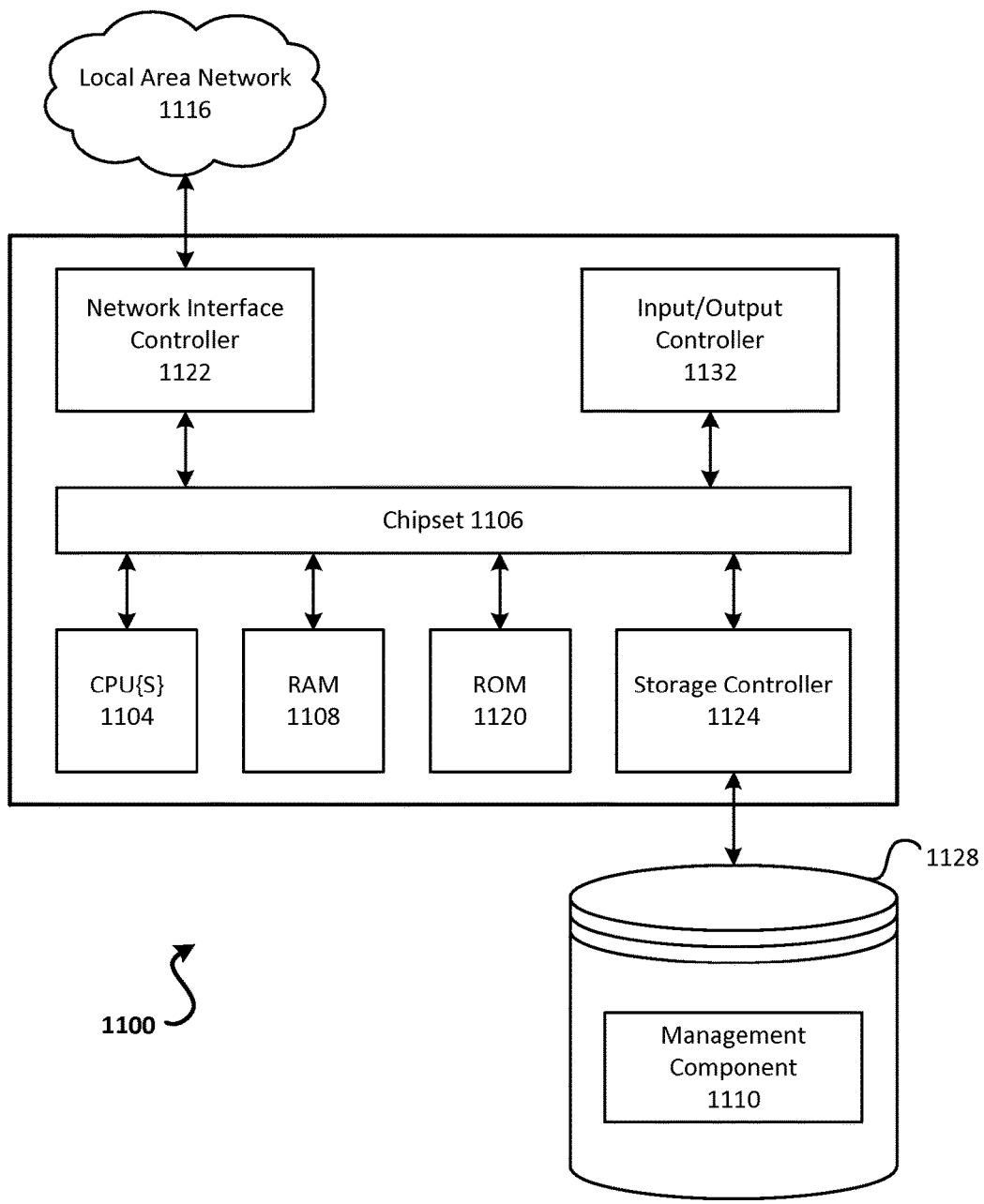
FIG. 11 depicts a computer that may be part of a datacenter, such as in FIG. 10.

Turning now to the figures, they begin with example environments in which these techniques may be implemented (FIGS. 1-3). Then, they move to example operating procedures that may be implemented to perform some of these techniques (FIGS. 4-8). And they conclude with further detail of example environments in which these techniques may be implemented (FIGS. 9-11).

FIG. 1 depicts an example operating environment in which embodiments may be implemented. In some embodiments, web services platform 150 may communicate with customer computer 102 via Internet 104. Web services platform 150 may provide computing services to customer computer 102 by executing one or more virtual machine (VM) instances on a computer of computer rack A 106A, computer rack B 106B, or computer rack N 106N, under the direction of customer computer 102. Web services platform 150 may also serve web pages to customer computer 102 from web server 112, or store data for customer computer 102 in object-level storage 114. In some embodiments, object-level storage 114 may store data as objects (e.g., files). It may be appreciated that there are embodiments where a block-level storage service is implemented instead of, or in addition to, storage 114.

The components of web services platform—computer rack A 106A, computer rack B 106B, computer rack N 106N, device analyzer A 108A, device analyzer B 108B, web server 112, and object-level storage 114—may be connected to each other via intranet 110. Intranet 110 may comprise networking equipment such as switches, routers, firewalls, and load balancers. In some embodiments, each of these components of web services platform, including the networking equipment, may be analyzed by device analyzer A 108A and device analyzer B 108B to determine if they are authorized to be connected to intranet 110 of web services platform 150. Techniques for determining whether a device is authorized are depicted in the following figures.

As depicted, web services platform 150 is divided into two logical components—web services network 160 and production network 170. In turn, as depicted, web services network 160 generally comprises a portion of web services platform 150 that offers compute services to users. In turn, production network 170 as depicted comprises web server 112 and object-level storage 114, and may generally host a web site for web services platform 150.

Web services network 160 and production network 170 may be considered to be separate intranets within web services platform 150, where communications between the two intranets is generally restricted relative to communications within an intranet. For example, each intranet may host a computer that has the same Internet Protocol (IP) address, and so addressing communications between these two computers would involve some degree of Network Address Translation (NAT) that may not be involved in communications between two computers solely within production network 170.

Given that web services network 160 and production network 170 may have some degree of isolation from each other, it may be that there is a separate device analyzer present in each intranet—device analyzer A 108A for web services network 160, and device analyzer B 108B for production network 170. In some embodiments, each device analyzer may perform analysis of unauthorized devices for its intranet separately. In other embodiments, there may be a central device analyzer that these device analyzers report to. In some embodiments, each device analyzer may send information about unauthorized device analysis to object-level storage 114. Turning now to the next figures, they describe in more detail techniques that may be used to determine whether a device is unauthorized.

FIG. 2 depicts an example rack of computers with corresponding networking equipment that may be a part of the web services platform of FIG. 1. In some embodiments, rack 200 may be computer rack A 106A, computer rack B 106B, or computer rack N 106N of FIG. 1. As depicted, rack 200 comprises switch 202, computer A 204A, computer B 204B, and computer N 204N. Each of computer A 204A, computer B 204B, and computer N 204N may have a communications link to switch 202, which connects the computers to each other, and to the network as a whole. Then, computer A 204A (and possibly the other computers), comprises a host partition 208 that supports the execution of one or more virtual machine (VM) instances, depicted here as VM instance A 206A, VM instance B 206B, and VM instance N 206N.

Information about the rack as a whole may be used to determine whether there is a possibly unauthorized device contained within, or connected to, the rack. For example, rack 200 may have a finite amount of space in which to hold computers—it may have a set number of slots to hold computers that are the same size as computer A 204A. So, if switch 202 is connected to more computers than there is space for in the rack 200, that may indicate that there is an unauthorized device connected to switch 202. The amount of devices that may fit into a given space may vary based on the size of the devices. For example, a rack that has 10U of space (a unit of measurement of device height) may have space for 10 1U servers, 5 2U servers, or some combination thereof.

It may also be that a rack generally comprises computers that are all of the same make and/or model. So, if there is a computer connected to switch 202 that differs in make and/or model from the other computers in rack 200, this may indicate that this different computer is unauthorized. A way to do this may involve an analysis of MAC addresses of the computers in rack 200. MAC addresses may be issued to computer makers in a known manner, so that two computer makers do not give two different computers the same MAC address. So, using information on which makers assign which range of MAC addresses, this technique may involve determining whether all computers in rack 200 are assigned to a range of MAC addresses that is issued by a single computer maker.

This technique of identifying an unauthorized device based on it being a different make or model of other computers in rack 200 may be distinguished from the techniques for identifying unauthorized devices in a homogeneous environment as discussed above. The homogeneous-environment techniques generally look at the entire network (e.g., an intranet) without regard to placement of a device within that intranet. In contrast, here, placement affects whether a device should be homogeneous with other devices or not. Two racks placed next to each other and connected to the same switch may contain different types of computers. So, here, determining an unauthorized device further involves determining which rack that device is physically located in.

Another technique for identifying unauthorized devices in rack 200 may include analyzing the VM instances running on rack 200 (e.g., VM instance A 206A). An unauthorized device may not be limited to a physical device, but may also include VM instances. Here, each VM instance running on rack 200 may be analyzed, and determined if it is accounted for in a management system (e.g., there is an entry for that VM instance in a VM instance management system that directs computers in web services platform 150 to start, stop, or perform other operations on or for VM instances; where it is accounted for in a management system, that may indicate that the VM instance is authorized). Where it is not accounted for in a management system, that may indicate that the VM instance is unauthorized (e.g., someone directly started that VM instance on a computer, so starting it was not validated by the management system).

In some embodiments, the lack of an entry for a VM instance in a management system may indicate that the VM instance is unauthorized. This may be different from the case of physical devices, where there may be a delay between when a physical device is connected to the network, and when it is identified in a management system. This may be because the management system itself directs the creation of VM instances, so a VM instance should not be running unless the management system knows about it and directed its creation.

In other embodiments, there may be decentralized creation of a VM instance, so there may be a delay between when the VM instance is created and when it is identified in a management system. In these situations, the lack of a VM instance being noted in a management system itself may not indicate that the VM instance is unauthorized, but determining whether it is unauthorized may involve further investigation, such as waiting a predetermined amount of time to see if the VM instance is noted in a management system before determining that it is unauthorized for being absent from the management system. These techniques applied to identifying an unauthorized device based on the characteristics of the rack in which it is contained, or otherwise connected to, are described in more detail with respect to the operating procedures of FIG. 8.

FIG. 3 depicts an example of two devices joined by a communications link, where information about each device may be determined from its neighboring device, and where these devices may be a part of the web services platform of FIG. 1. In some embodiments, switch A 302A and switch B 302B may each be instances of switch 202 of FIG. 2. It may be appreciated that, while FIG. 3 depicts the communication link between two switches, these techniques may apply to other types of devices, be they the same type of device (e.g., two routers), or different types of devices (e.g., a router and a switch).

As depicted, in FIG. 3, switch A 302A and switch B 302B are connected by communications link 304. Communications link may be a wired Ethernet link between a physical port of each switch. In other embodiments, two devices may be connected via a WiFi link, a Bluetooth link, or another network communications protocol link. In some embodiments, each of switch A 302A and switch B 302B may have multiple communications ports (e.g., multiple physical ports for wired connections, or multiple WiFi chips for separate, simultaneous WiFi connections). Where that is the case, switch A 302A and switch B 302B may have multiple connections with each other, such as to provide backup in case one connection fails.

Information about the two devices together may provide information about unauthorized devices in addition to determining information about unauthorized devices from one of the two devices alone. For example, it may be that switch A 302A has a connection in half-duplex operation. Alone, this may be fine, because the switch may have a valid reason for being connected to another device via half-duplex operation. However, if that connection is supposed to be made to switch B 302B, and if it is standard practice in this network for switches to be connected together via a full-duplex connection, this may indicate that there is an unauthorized device located between the two switches (e.g., there may be an unauthorized hub located between the two switches, because hubs usually communicate via a half-duplex connection).

Therefore, while looking at switch A 302A alone may not provide information to identify a possible unauthorized device, looking at switch A 302A in concert with its neighboring device switch B 302B and the communications link 304 between the two may provide information to identify a possibly unauthorized device. These applied techniques identifying an unauthorized device based on two devices connected with each other, are described in more detail with respect to the operating procedures of FIG. 6.

Figure 4:
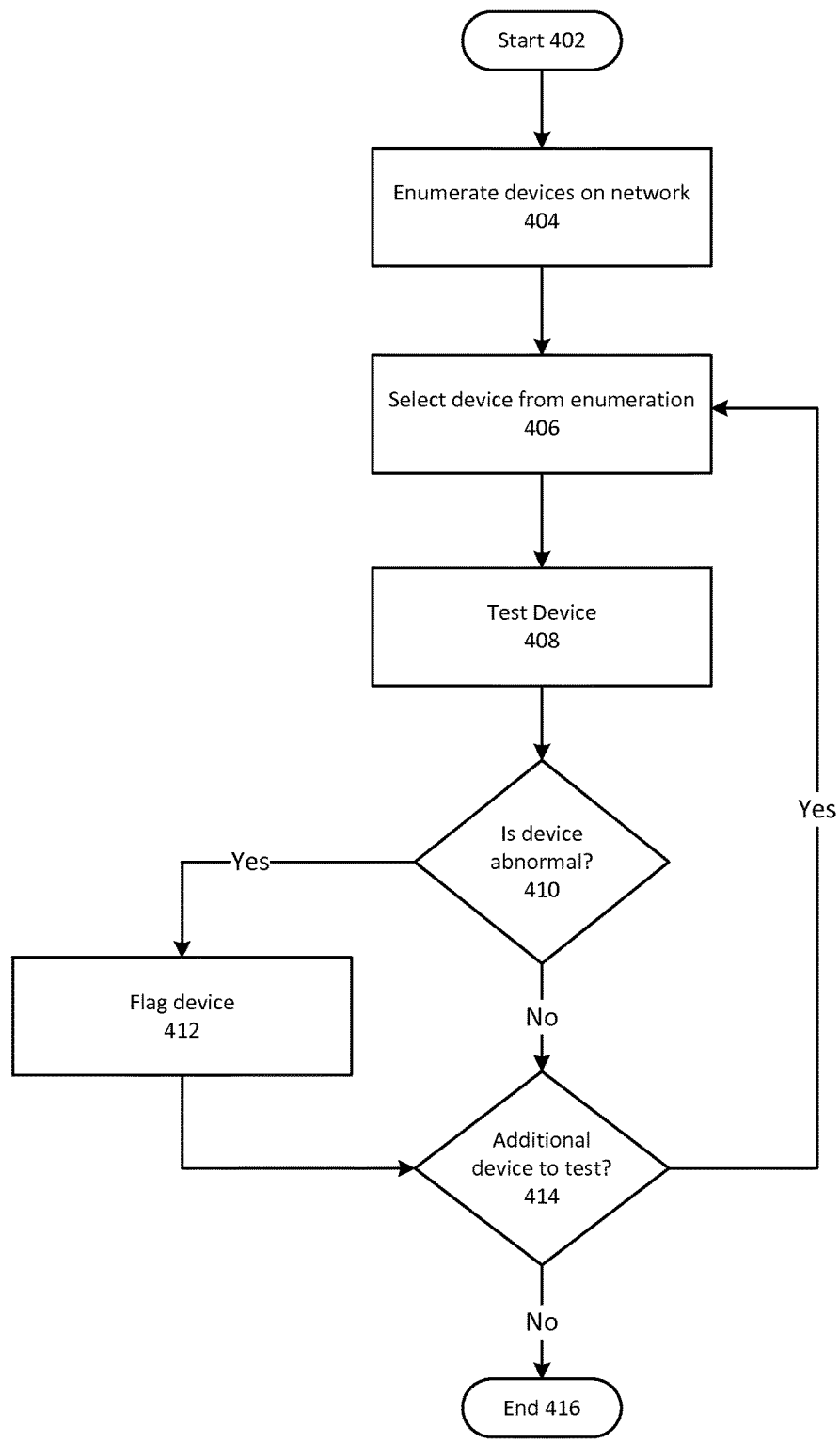
FIG. 4 depicts example operating procedures for identifying an unauthorized device in a heterogeneous environment, such as the web services platform of FIG. 1.

FIG. 4 depicts example operating procedures for identifying an unauthorized device in a heterogeneous environment, such as the web services platform of FIG. 1. In some embodiments, the operating procedures of FIG. 4 (and FIGS. 5-8) may be implemented by device analyzer A 108A or device analyzer B 108B of FIG. 1 to analyze the heterogeneous devices of web services platform 150 to identify any unauthorized devices.

It may be appreciated that there are embodiments that do not implement all of the operating procedures depicted in FIG. 4 (and FIGS. 5-8), or implement the depicted operating procedures in a different order than is depicted. Regarding the former, for example, there may be embodiments that operate on a single device, and so omit operations 404, 406, and 414, which generally involve enumerating a plurality of devices and traversing this enumeration to analyze each device to determine whether it is abnormal. Regarding embodiments that implement the depicted operating procedures in a different order than is depicted, for example, there may be embodiments that implement operation 508 of FIG. 5 before operation 506.

The operating procedures of FIG. 4 begin with operation 402 and move to operation 404. Operation 404 depicts enumerating the devices on the network. These devices may comprise a combination of a computing node, a virtual machine (VM) instance, a switch, a router, a hub, a firewall device, and a load balancer. In some embodiments, this may comprise determining the devices on the network from a management system that manages the presence of the devices on a network. In other embodiments, an unauthorized device may not be present in the management system, and this may comprise determining each device that has been assigned an IP address from an entity on the network that assigns IP addresses (and a device may be assigned multiple IP addresses).

Still, there may be devices that are not assigned IP addresses, such as hubs. So, a further step in enumeration may involve traversing the network topology by identifying all neighboring devices of each device (where, if a device is connected to the network, it will be connected to a known device, with some number of neighboring devices connecting the two). In some embodiments, operation 404 may comprise identifying a plurality of devices in the computer network. In some embodiments, operation 404 may also comprise monitoring a plurality of heterogeneous devices connected to the computer network, the computer network permitting a plurality of users to connect heterogeneous devices to the computer network. After operation 404, the operating procedures of FIG. 4 move to operation 406.

Operation 406 is reached from operation 404, or from operation 414 where it is determined that there is an additional device in the enumeration of devices determined in operation 404 to test. Operation 406 depicts selecting a device from the enumeration of devices determined in operation 404. This may comprise maintaining a list of the enumerated devices in a file, and traversing the list, starting with the first device contained within the file, and proceeding until there are no more devices listed, as determined in operation 414. After operation 406, the operating procedures of FIG. 4 move to operation 408.

Operation 408 depicts testing the device selected in operation 406. In some embodiments, testing the device may involve performing the operating procedures of one or more of FIGS. 5-8. In some embodiments, operation 408 may comprise analyzing a first device of the plurality of devices to determine whether the first device is authorized to be connected to the network based at least in part on the first device and another of the plurality of devices.

In some embodiments, operation 408 may comprise identifying a change to a network configuration relating to a first device of a plurality of heterogeneous devices connected to the computer network; and determining whether a second device that has been connected to the computer network is unauthorized to connect to the computer network based at least in part on the identified change to the network configuration of the first device of the plurality of heterogeneous devices connected to the computer network. After operation 408, the operating procedures of FIG. 4 move to operation 410.

Operation 410 depicts determining whether testing the device in operation 408 indicates that the device is unauthorized or otherwise abnormal. For example, where multiple of these techniques of the operating procedures of FIGS. 5-8 are used, each of these techniques may be used to assign a score indicative of whether the first device is unauthorized and a total score may be determined that indicates a likelihood that the device is unauthorized (e.g., the device is considered unauthorized when the score is above a predetermined threshold amount). In other embodiments, where any one of the techniques identifies the device as rogue, this may cause the system to identify the device as rogue regardless of whether all other techniques identify the device as authorized. In some embodiments, determining a score may comprise: performing a plurality of types of analyses that identify whether a first device is authorized to be connected to the network, each type of analysis being performed to determine a score; and determining that the first device is unauthorized to connect to the network when a combination of the scores of each type of analysis is above a predetermined threshold value.

Where in operation 410 it is determined that testing the device indicates that the device is unauthorized or otherwise abnormal, the operating procedures of FIG. 4 move to operation 412. Instead, where in operation 410 it is determined that testing the device indicates that the device is authorized or otherwise normal, the operating procedures of FIG. 4 move to operation 414.

Operation 412 is reached from operation 410 where in operation 410 it is determined that testing the device indicates that the device is unauthorized or otherwise abnormal. Operation 412 depicts flagging the device. In some embodiments, flagging a device may comprise performing a task based on determining that the device is unauthorized, such as sending an indication to an administrator to further investigate the device. In some embodiments, the device may be disconnected from the network (e.g., an Internet Protocol (IP) address assigned to it may be revoked, or its neighboring devices may be instructed not to communicate with it, or to not communicate along a communications link that the rogue device has access to) until an administrator investigates the device.

In some embodiments, operation 412 may comprise, in response to determining that the first device is unauthorized to be connected to the network, storing an indication that the first device is unauthorized to be connected to the network. In some embodiments, operation 412 may comprise disconnecting the first device from the network, and/or alerting an administrator of the network that the first device is unauthorized. For instance, it may be that the unauthorized device is benign (like an Internet-connected television), and so an alert to an administrator (or even a more minor action) is appropriate. After operation 412, the operating procedures of FIG. 4 move to operation 414.

Operation 414 is reached from operation 412, or from operation 410 where it is determined that testing the device indicates that the device is authorized or otherwise normal. Operation 414 depicts determining whether there is another device to test. In some embodiments, where the devices on the network are enumerated into a list contained within a file, such as described with respect to operation 406, this may comprise determining whether there is another device listed (there is another device to test), or the end of the file or list has been reached (there is not another device to test).

Where in operation 414 it is determined that there is another device in the enumeration of devices determined in operation 404 to test, the operating procedures of FIG. 4 return to operation 406. Instead, where in operation 414 it is determined that there is not another device to test, the operating procedures of FIG. 4 move to operation 416, where the operating procedures of FIG. 4 end. If operation 416 is reached and a particular device that was tested in operation 408 is not flagged as unauthorized or otherwise abnormal, this may indicate that the device is considered to be authorized.

Figure 5:
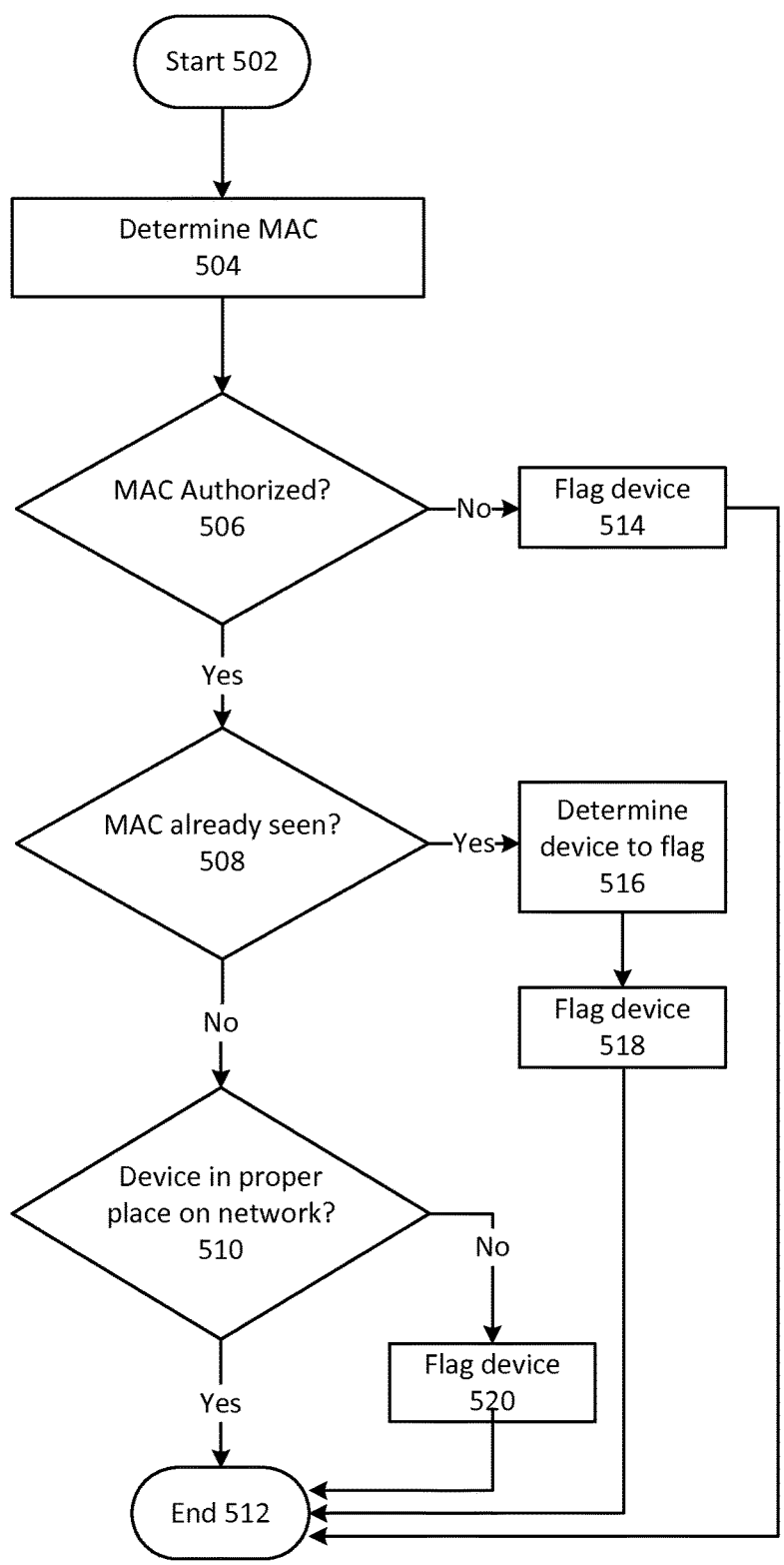
FIG. 5 depicts example operating procedures for identifying an unauthorized device in a heterogeneous environment based, such as the web services platform of FIG. 1, based on its Media Access Control (MAC) address.

FIG. 5 depicts example operating procedures for identifying an unauthorized device in a heterogeneous environment, such as the web services platform of FIG. 1, based on its Media Access Control (MAC) address. While the operating procedures generally describe operations involving MAC addresses, it may be appreciated that the techniques may be applied to other identifiers for devices. In some embodiments, the operating procedures of FIG. 5 may be implemented by device analyzer A 108A or device analyzer B 108B of FIG. 1 to analyze the heterogeneous devices of web services platform 150 to identify any unauthorized devices. In some embodiments, the operating procedures of FIG. 5 may be used to test a device as depicted in operation 408 of FIG. 4.

The operating procedures of FIG. 5 begin with operation 502 and move to operation 504. Operation 504 depicts determining a Media Access Control (MAC) address of a device. For instance, a device analyzer may send a ping command to a device, where the device will respond with its MAC address (along with possibly other information). Where a device has more than one MAC address (e.g., it has more than one network adapter), operation 504 may comprise determining each MAC address for a device. It may be that the device self-reports an incorrect MAC address, and there are techniques for mitigating against this, disclosed herein. After operation 504, the operating procedures of FIG. 5 move to operation 506.

Operation 506 depicts determining whether the MAC address determined in operation 504 is authorized. In some embodiments, a management system for the network may maintain a list of authorized devices along with their MAC addresses. In these embodiments, operation 506 may comprise determining whether the MAC address (or addresses) for the device identified in operation 504 is found in this list of MAC addresses of authorized devices. In some embodiments, operation 506 may comprise determining whether a MAC address of a first device is stored by a computing node that maintains a list of MAC addresses for authorized devices in the network.

In some embodiments, the system may account for a lag between when a device is added to a network and when it may be recognized by the management system. In such embodiments, a device analyzer may wait a period of time and then re-analyze the device. This may comprise, after determining that the MAC address of a first device is not stored by a computing node that maintains the list of MAC addresses for authorized devices in the network, waiting a predetermined amount of time; and after waiting the predetermined amount of time, determining that the first device is unauthorized to be connected to the network where the MAC address of the first device is still not stored by the computing node that maintains the list of MAC addresses for authorized devices in the network. In other embodiments, there may be information available about when a device first connects to the network (such as a time at which it obtained an IP address), and that time may be used as a starting point for determining how long a lag until an authorized device is recognized by the management system should last.

Where it is determined that the device is authorized, the operating procedures of FIG. 5 move to operation 508. Instead, where it is determined that the device is unauthorized, the operating procedures of FIG. 5 move to operation 514.

Operation 508 is reached from operation 506 where it is determined that the MAC address is authorized. Operation 508 depicts determining whether the MAC address has already been seen by device analyzer A 108A or device analyzer B 108B. In some embodiments, testing the devices of the network for authorization may be performed en masse. As each device is analyzed, it may be noted that its corresponding MAC address has been encountered. Where a new device is analyzed, and its MAC address has already been noted, this may indicate that the MAC address has already been seen. In general, MAC addresses are unique, so two devices reporting the same MAC address may indicate that one of the devices is spoofing its MAC address (possibly because it is unauthorized). In some embodiments, operation 508 may comprise determining that the first device is unauthorized to be connected to the network when a MAC address of a first device is the same as a MAC address of a second device of a plurality of devices.

Where it is determined that the MAC address has not already been seen, the operating procedures of FIG. 5 move to operation 510. Instead, where it is determined that the MAC address has already been seen, the operating procedures of FIG. 5 move to operation 516.

Operation 510 is reached from operation 508 where it is determined that the MAC address has not already been seen. Operation 510 depicts determining whether the first device is located in a proper place on the network. For instance, a particular device may be authorized for web services network 160 rather than production network 170, but it may be connected to the latter. This would indicate that it is not located in a proper place on the network. In some scenarios, this may be relatively benign—an administrator for the web services network 160 side of web services platform 150 may have connected his or her laptop to the production network 170 side of web services platform 150. In other scenarios, this may indicate that there is a malicious, unauthorized device on the network, where the attacker had a flaw in its attack by connecting the device to the wrong intranet within the network.

Where it is determined that the device is located in a proper place on the network, this may indicate that the device is authorized according to the tests of the operating procedures of FIG. 5. Then, the operating procedures of FIG. 5 move to operation 512, where the operating procedures of FIG. 5 end. Instead, where it is determined that the device is not located in a proper place on the network, the operating procedures of FIG. 5 move to operation 520.

Operation 514 is reached from operation 506 where it is determined that the MAC address is unauthorized. Operation 514 depicts flagging the device. In some embodiments, operation 514 may be implemented in a similar manner as operation 412 of FIG. 4. After operation 514, the operating procedures of FIG. 5 move to operation 512, where the operating procedures of FIG. 5 end.

Operation 516 is reached from operation 506 where it is determined that the MAC address has already been seen.

Operation 516 depicts determining a device to flag among the devices that share a MAC address. For example, this may comprise further analyzing the devices (such as by performing the operating procedures of one or more of FIGS. 6-8) to determine which is more likely to be unauthorized, or by determining to flag all devices that share a MAC address (e.g. storing an indication in a memory that each of the devices is, or may be, unauthorized to connect to the network). In some embodiments, operation 516 may comprise flagging the first device upon determining that it is more likely that the first device is unauthorized to be connected to the network than that the second device is unauthorized to be connected to the network. After operation 516, the operating procedures of FIG. 5 move to operation 518.

Operation 518 depicts flagging the device determined in operation 516. In some embodiments, operation 518 may be implemented in a similar manner as operation 412 of FIG. 4. After operation 518, the operating procedures of FIG. 5 move to operation 512, where the operating procedures of FIG. 5 end.

Operation 520 is reached from operation 506 where it is determined that the device is not in a proper place on the network. Operation 520 depicts flagging the device. In some embodiments, operation 520 may be implemented in a similar manner as operation 412 of FIG. 4. After operation 520, the operating procedures of FIG. 5 move to operation 512, where the operating procedures of FIG. 5 end.

Figure 6:
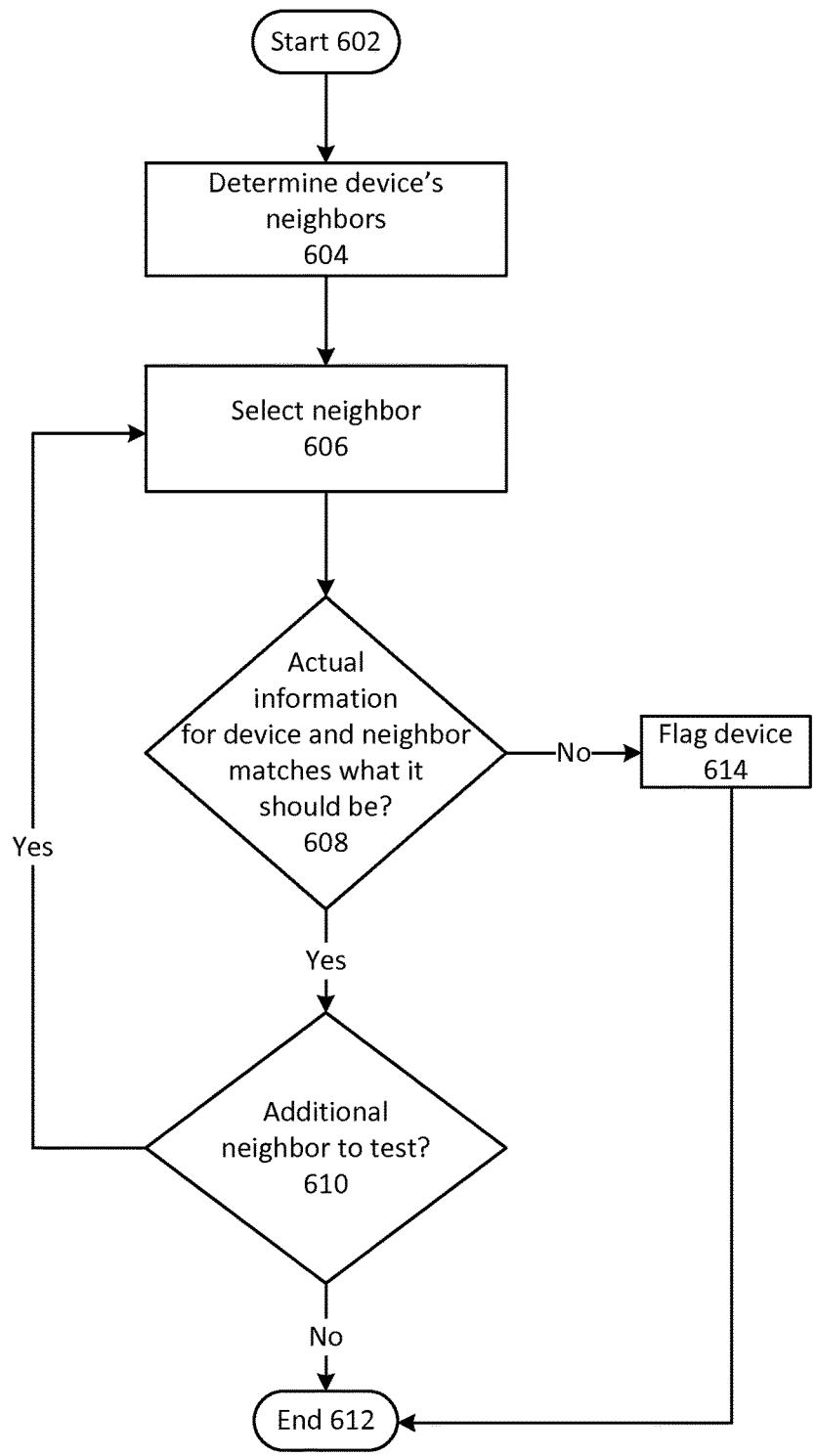
FIG. 6 depicts example operating procedures for identifying an unauthorized device in a heterogeneous environment, such as the web services platform of FIG. 1, based on information about a neighboring device.

FIG. 6 depicts example operating procedures for identifying an unauthorized device in a heterogeneous environment, such as the web services platform of FIG. 1, based on information about a neighboring device. In some embodiments, the operating procedures of FIG. 6 may be implemented by device analyzer A 108A or device analyzer B 108B of FIG. 1 to analyze the heterogeneous devices of web services platform 150 to identify any unauthorized devices. In some embodiments, the operating procedures of FIG. 6 may be used to test a device as depicted in operation 408 of FIG. 4.

The operating procedures of FIG. 6 begin with operation 602 and move to operation 604. Operation 604 depicts determining a device's neighbors. In some embodiments, this may comprise maintaining a list of devices as they are added to the network to a management system. While this list of devices may not include unauthorized devices, as unauthorized devices may not be listed in the management system, this approach may still aid in identifying unauthorized devices. This approach may be used to determine if there is a device located between a device and what the management system has listed as that device's neighbor (e.g., the management system may say that a device should be connected to a particular switch on a particular communications port of that device, and if that is not what is really present, that may indicate that there is an unauthorized device present).

In other embodiments, this may comprise enumerating the communications ports of a device to determine which devices it is connected to. This may be effectuated, for example, by executing an agent process on the device that performs this task and reports the results back to the device analyzer. In other embodiments, this may involve using a link layer discovery protocol (LLDP) for a device to determine the device's neighbors. After operation 604, the operating procedures of FIG. 6 move to operation 606.

Operation 606 is reached from operation 604, or from operation 610 where it is determined that there is an additional neighbor to test from the neighbors determined in operation 604. Operation 606 depicts selecting a neighboring device determined in operation 604. This may comprise, for example, maintaining a file that contains a list of the devices determined in operation 604, and selecting the first device in the list that has not already been selected in a previous iteration of operation 606. After operation 606, the operating procedures of FIG. 6 move to operation 608.

Operation 608 depicts determining if the actual information for the device and its neighbor matches what it should be. This may comprise retrieving information about both the device and its neighbor, such as a speed of a connection (e.g., 10 gigabits/sec, 1 gigabit/sec, 100 megabits/sec) or a type of connection (e.g., half-duplex or full-duplex), and also determining what this information should be. For example, if both the device and its neighbor are configured to communicate at 10 Gb/sec on the communications ports they are using, and the communications link is 1 Gb/sec, then it is likely that there is an unauthorized device on that communications link between the device and its neighbor.

Similarly if both the device and its neighbor are switches, it may be determined that switches usually communicate with each other via a full-duplex communications link. And if that communications link is actually at half-duplex, then that may indicate that there is an unauthorized device on the communications link between the two devices. For example, it may be that hubs communicate at half-duplex speed, so this may indicate that not only is there an unauthorized device, but also that this unauthorized device may be a hub. In some embodiments, operation 608 may comprise determining a characteristic of an actual type of communications link between a first device and a second device of the plurality of devices differs from a characteristic of a type of communications link that should be present between the first device and the second device. This characteristic may be whether the connection is full-duplex or half-duplex, or a speed of the connection.

In other embodiments where a device's neighbor's MAC address at a previous time is known, it may be compared against the neighbor's current MAC address. Where that MAC address has changed, that may indicate that the neighbor device is unauthorized (or something benign, such as the neighbor device's motherboard failed and was replaced).

Where in operation 608 it is determined that the actual information for the device and its neighbor matches what it should be, the operating procedures of FIG. 6 move to operation 610. Instead, where in operation 608 it is determined that the actual information for the device and its neighbor does not match what it should be, the operating procedures of FIG. 6 move to operation 614.

Operation 610 is reached from operation 608 where it is determined that the actual information for the device and its neighbor matches what it should be. Operation 610 depicts determining whether there is an additional neighbor to test from the neighbors determined in operation 604. Where the set of neighbors is maintained in a list in a file that is traversed in order, this may comprise determining whether there is a subsequent entry in the list for another neighbor (which would indicate that there is an additional neighbor to test), or that the end of the list has been reached (which would indicate that there is not an additional neighbor to test).

Where in operation 610 it is determined that there is an additional neighbor to test, the operating procedures of FIG. 6 return to operation 606. Instead, where in operation 610 it is determined that there is not an additional neighbor to test, the operating procedures of FIG. 6 move to operation 612, where the operating procedures of FIG. 6 end. This may indicate that the device is authorized according to the tests of the operating procedures of FIG. 6.

Operation 614 is reached from operation 608 where it is determined that the actual information for the device and its neighbor does not match what it should be. Operation 614 depicts flagging the device and/or its neighbor. In some embodiments, this may comprise flagging the device alone, flagging the device and its neighbor, or indicating that there appears to be a device between the device and its neighbor that is to be flagged. In some embodiments, the act of flagging the device may be implemented in a similar manner as operation 412 of FIG. 4. After operation 614, the operating procedures of FIG. 6 move to operation 612, where the operating procedures of FIG. 6 end.

Figure 7:
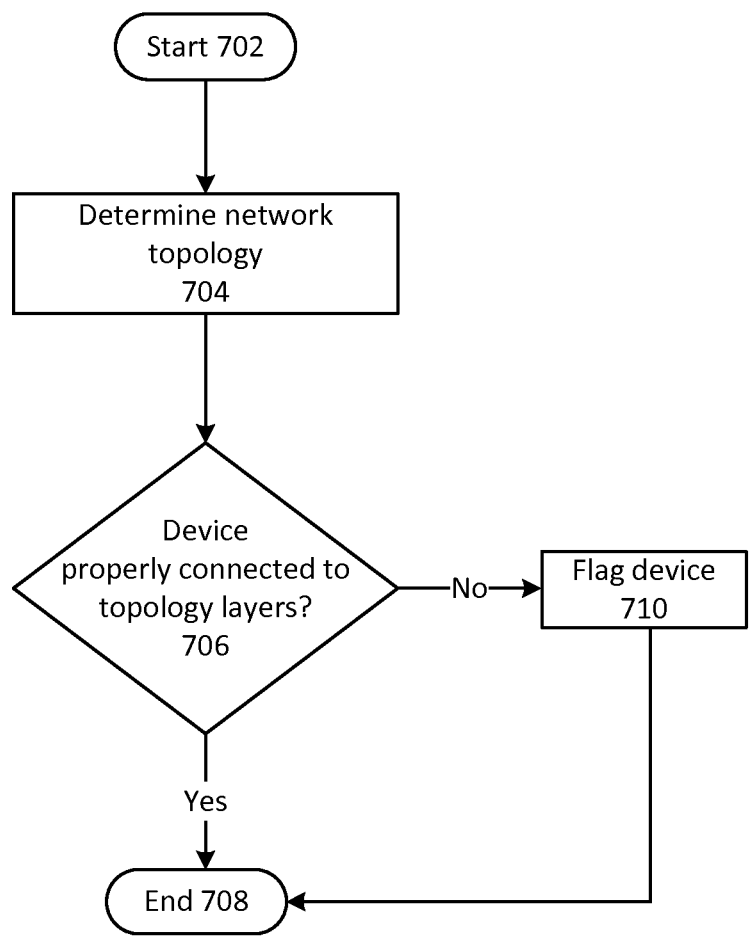
FIG. 7 depicts example operating procedures for identifying an unauthorized device in a heterogeneous environment, such as the web services platform of FIG. 1, based on how it is connected to layers of a network topology.

FIG. 7 depicts example operating procedures for identifying an unauthorized device in a heterogeneous environment, such as the web services platform of FIG. 1, based on how the device is connected to layers of a network topology. In some embodiments, the operating procedures of FIG. 5 may be implemented by device analyzer A 108A or device analyzer B 108B of FIG. 1 to analyze the heterogeneous devices of web services platform 150 to identify any unauthorized devices. In some embodiments, the operating procedures of FIG. 7 may be used to test a device as depicted in operation 408 of FIG. 4.

The operating procedures of FIG. 7 begin with operation 702, and move to operation 704. Operation 704 depicts determining the network topology. In some embodiments, the network topology may be predetermined and maintained by a management system as devices are added to or removed from the network. In other embodiments, a network mapping process may be effectuated to determine the network topology, such as by executing an nmap network mapping process on the network. After operation 704, the operating procedures of FIG. 7 move to operation 706.

Operation 706 depicts determining whether the first device is properly connected to the layers of the network topology. For example, the network may comprise an aggregation layer that aggregates sessions entering or leaving the network, and may perform roles such as load balancing and providing firewall services. The network may also comprise a core layer which may connect aggregation layers in multiple data centers of a network. In some embodiments, it may be determined that a device is or is not connected to the proper layer(s) in the network topology. For example, a switch in a rack may be connected to an aggregation layer, which may be interpreted as the switch being properly connected to the layers of the network topology. Or, the switch may be connected to a different layer, which may be interpreted as the switch being improperly connected to the layers of the network topology. In some embodiments, operation 706 may comprise determining whether a first device is connected to a proper layer of a network topology of the network.

Where in operation 706 it is determined that the device is properly connected to the layers of the network topology, the operating procedures of FIG. 7 move to operation 708, where the operating procedures of FIG. 7 end. This may indicate that the device is authorized according to the tests of the operating procedures of FIG. 7. Instead, where in operation 706 it is determined that the device is not properly connected to the layers of the network topology, the operating procedures of FIG. 7 move to operation 710.

Operation 710 is reached from operation 706 where it is determined that the device is not properly connected to the layers of the network topology. Operation 710 depicts flagging the device. In some embodiments, operation 710 may be implemented in a similar manner as operation 412 of FIG. 4. After operation 710, the operating procedures of FIG. 7 move to operation 708 where the operating procedures of FIG. 7 end.

Figure 8:
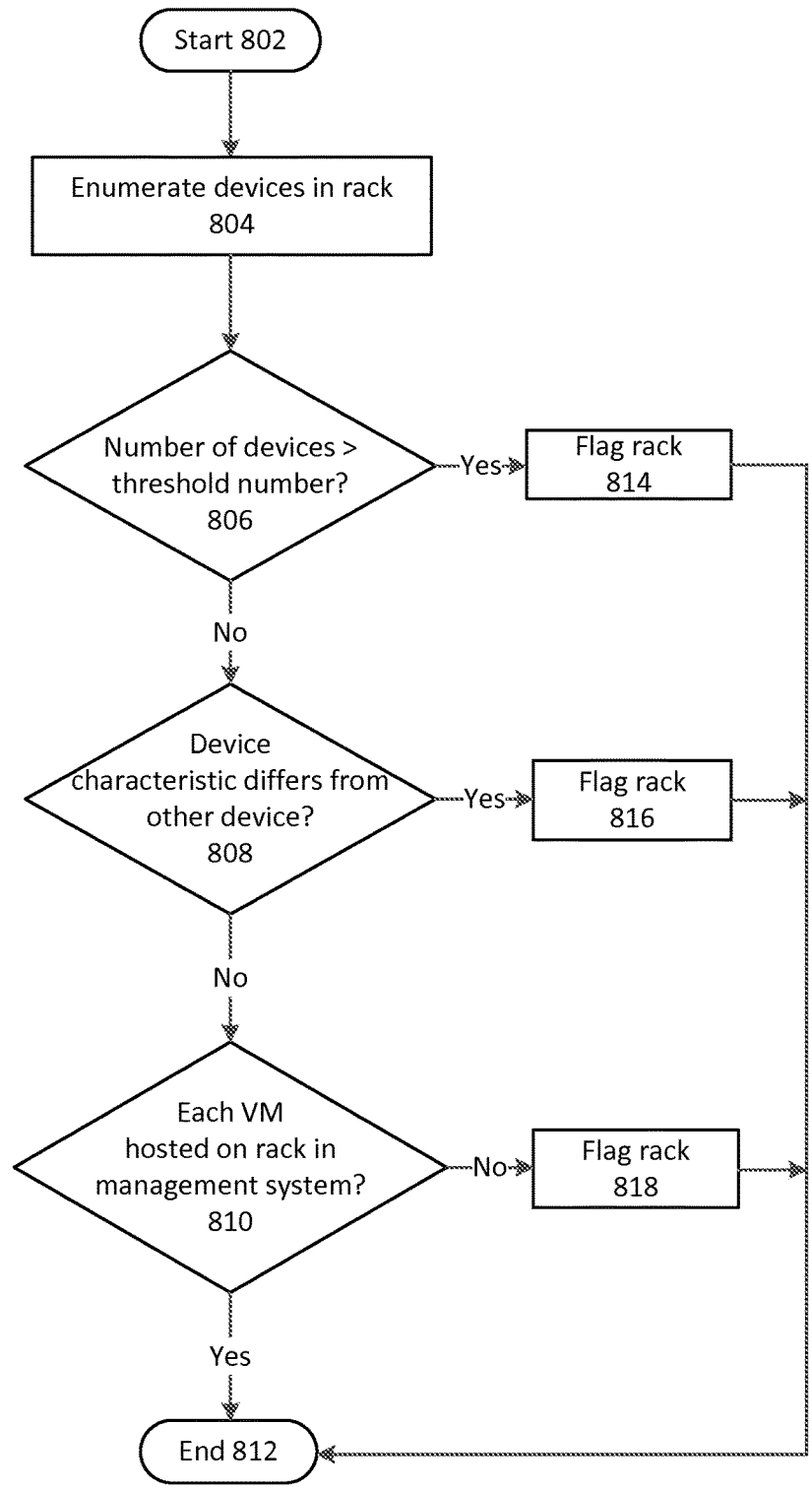
FIG. 8 depicts example operating procedures for identifying an unauthorized device in a heterogeneous environment, such as the web services platform of FIG. 1, based on characteristics of a rack of devices in which it is contained.

FIG. 8 depicts example operating procedures for identifying an unauthorized device in a heterogeneous environment, such as the web services platform of FIG. 1, based on characteristics of a rack of devices in which the device is contained. In some embodiments, the operating procedures of FIG. 5 may be implemented by device analyzer A 108A or device analyzer B 108B of FIG. 1 to analyze the heterogeneous devices of web services platform 150 to identify any unauthorized devices in rack A 106A, rack B 106B, or rack N 106N. In some embodiments, the operating procedures of FIG. 8 may be used to test a device as depicted in operation 408 of FIG. 4.

The operating procedures of FIG. 8 begin with operation 802 and move to operation 804. Operation 804 depicts enumerating the devices in a rack of devices. In some embodiments, this may comprise determining each device in the rack that is connected to a switch that handles data communications that enter and exit the rack. After operation 804, the operating procedures of FIG. 8 move to operation 806.

Operation 806 depicts determining whether the number of devices connected to a switch in the rack is greater than a threshold number of devices. For example, there may be physical space in a rack to hold a fixed number of devices given the size of a server that goes in the rack. If there are more identified devices for the rack than there is space for devices, this may indicate that there is an extra, unauthorized device attached to the rack (such as to the switch for the rack) somehow. In some embodiments, operation 806 may comprise determining whether a number of devices connected to a switch of a rack of devices of a plurality of devices is above a predetermined threshold number, wherein a first device that is being analyzed is connected to a switch of the rack.

Where in operation 806 it is determined that the number of devices connected to a switch in the rack is not greater than a threshold number of devices, the operating procedures of FIG. 8 move to operation 808. Instead, where it is determined in operation 806 that the number of devices connected to a switch in the rack is greater than a threshold number of devices, the operating procedures of FIG. 8 move to operation 814.

Operation 808 is reached from operation 806 where it is determined that the number of devices connected to a switch in the rack is not greater than a threshold number of devices. Operation 808 depicts determining whether a characteristic of a device in the rack differs from another device in the rack. It may be that, in a given network, it is common for racks to contain all computers of one type, and from one manufacturer (though, for example, a switch in a rack may be from a different manufacturer than the server computers in the rack). Where there is a device in the rack that is of a different make or model from the other devices in the rack, this may indicate that this differing device is unauthorized.

A way to determine the type of devices is to evaluate their MAC addresses. Commonly, manufacturers will be issued exclusive use of ranges of MAC addresses to assign to computers they build. That way, two different manufacturers will not accidentally assign the same MAC address to two different devices. So, the MAC addresses of the devices in the rack may be evaluated to determine if they all indicate devices from the same manufacturer. In some embodiments, operation 808 may comprise determining whether a type of a first device is the same as the type of a second device of a plurality of devices, the first device and the second device being connected to a switch of a rack of devices of the plurality of devices.

Other characteristics to evaluate may involve information about what devices are expected to be in a rack. For example, a management system that manages execution of a rack (e.g., a management system of web services platform 150 of FIG. 1 that manages execution of the devices in computer rack A 106A) may provide device analyzer A 108A with information about what devices are expected in a rack.

For example, this information may indicate that a particular rack should have one type of servers. And where the rack has two other types of servers, the presence of these other types of servers may indicate that the other types of servers are not authorized to be connected in that location. Or, the management system may provide device analyzer A 108A with a whitelist range of MAC addresses that may be in a rack. Then, where device analyzer A 108A determines that there is a device in the rack that has a MAC address not contained in the whitelist, device analyzer 108A may flag this device as being unauthorized.

Where in operation 808 it is determined that a characteristic of a device in the rack does not differ from another device in the rack, the operating procedures of FIG. 8 move to operation 810. Instead, where in operation 808 it is determined that a characteristic of a device in the rack differs from another device in the rack, the operating procedures of FIG. 8 move to operation 816.

Operation 810 is reached from operation 808 where it is determined that a characteristic of a device in the rack does not differ from another device in the rack. Operation 810 depicts determining whether each virtual machine (VM) hosted on the rack is noted in a management system. In contrast to physical devices, which may be installed on the network and then noted to a management system, the creation of VMs may be regulated by a management system. So, for a VM to be created, a management system directs that to occur. Where this is the case, if an executing VM is not noted in a corresponding management system, this may indicate that this VM is unauthorized. This operation may be performed for each VM executing on a physical device in the rack.

Where in operation 810 it is determined that each virtual machine (VM) hosted on the rack is noted in a management system, the operating procedures of FIG. 8 move to operation 812. This may indicate that the devices of the rack are authorized according to the tests of the operating procedures of FIG. 8. Instead, where in operation 810 it is determined that a VM hosted on the rack is not noted in a management system, the operating procedures of FIG. 8 move to operation 818.

Operation 814 is reached from operation 806 where it is determined in operation 806 that the number of devices connected to a switch in the rack is greater than a threshold number of devices. Operation 814 depicts flagging the rack. In some embodiments, operation 814 may be implemented in a similar manner as operation 412 of FIG. 4, but for a rack instead of a device, because it appears that there is an extra device attached to the rack, though which device this is specifically may not yet be identified. After operation 814, the operating procedures of FIG. 8 move to operation 812 where the operating procedures of FIG. 8 end.

Operation 816 is reached from operation 808 where in operation 808 it is determined that a characteristic of a device in the rack differs from another device in the rack. Operation 816 depicts flagging the device. In some embodiments, operation 816 may be implemented in a similar manner as operation 412 of FIG. 4. After operation 816, the operating procedures of FIG. 8 move to operation 812 where the operating procedures of FIG. 8 end.

Operation 818 is reached from operation 810 where in operation 810 it is determined that a VM hosted on the rack is not noted in a management system. Operation 818 depicts flagging the VM. In some embodiments, operation 818 may be implemented in a similar manner as operation 412 of FIG. 4, but for a VM rather than a device. After operation 818, the operating procedures of FIG. 8 move to operation 812 where the operating procedures of FIG. 8 end.

FIGS. 9-11 are similar to FIG. 1 in that they depict example operating environments in which embodiments disclosed herein may be implemented, and said figures depict these operating environments at varying levels of granularity. FIG. 9 generally depicts a web services platform that comprises a plurality of datacenters. FIG. 10 generally depicts a datacenter that comprises a plurality of computers. FIG. 11 generally depicts a computer that may be part of a datacenter.

It may be appreciated that the operating environments of FIGS. 9-11 may be used to implement aspects of the operating environment of FIG. 1. For example, web services platform 150 and its components may be implemented in web services platform 908 of FIG. 9. Likewise, Internet 104 of FIG. 1 may be wide area network 906 of FIG. 9, and device analyzer A 108A, device analyzer B 108B, web server 112, and object-level storage 114 may each be customer computing system 904 of FIG. 9 and/or computer 1100 of FIG. 11.

Turning now to details of FIG. 9, this figure depicts an example of a suitable computing environment in which embodiments described herein may be implemented. A cloud service provider (such as web services platform 908) may configure the illustrated computing environment to host virtual clouds of entities and to enable communication paths between these virtual clouds that may otherwise be isolated. In particular, FIG. 9 is a system and network diagram that shows an illustrative operating environment 900 that includes a web services platform 908 for implementing virtual clouds and for providing on-demand access to compute resources, such as virtual machine instances. Web services platform 908 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 908 may be enabled by one or more datacenters 902A-902N, which may be referred herein singularly as "datacenter 902" or in the plural as "datacenters 902." Datacenters 902 may be facilities that house and operate computer systems and associated components and may include redundant and backup power, communications, cooling, and security systems. Datacenters 902 may be located in a same geographical area, such as in a same facility, and may be interconnected using private networks, such as high-speed fiber optic networks, controlled and managed by a service provider of web services platform 908. Datacenters 902 may also be distributed across geographically disparate locations and may be interconnected in part using public networks, such as the Internet. One illustrative configuration for datacenter 902 that implements the concepts and technologies disclosed herein is described below with regard to FIG. 10.

Entities of web services platform 908 may access the compute resources provided by datacenters 902 over a wide area network (WAN) 906. Although a WAN is illustrated in FIG. 9, it should be appreciated that a local area network (LAN), the Internet, or any other networking topology known in the art that connects datacenters 902 to remote entities and other users may be utilized. It should also be appreciated that combinations of such networks may also be utilized.

An entity or other entities that are customers of web services platform 908 may utilize a customer computing system 904 to access the compute resources provided by datacenters 902. Customer computing system 904 comprises a computer capable of accessing web services platform 908, such as a server computer, a desktop or laptop personal computer, a tablet computer, a wireless telephone, a PDA, an e-reader, a game console, a set-top box, or any other computing node.

As is described in greater detail below, customer computing system 904 may be utilized to configure aspects of the compute resources provided by web services platform 908. In this regard, web services platform 908 may provide a web interface through which aspects of its operation may be configured through the use of a web browser application program executing on customer computing system 904. Alternatively, a stand-alone application program executing on customer computing system 904 may access an application programming interface (API) (not shown) exposed by web services platform 908 for performing the configuration operations. Other mechanisms for configuring the operation of web services platform 908, including launching new virtual machine instances on web services platform 908, may also be utilized.

According to embodiments disclosed herein, capacities of purchased compute resources provided by web services platform 908 can be scaled in response to demand. In this regard, scaling refers to the process of instantiating, which may also be referred to herein as "launching" or "creating," or terminating, which may also be referred to herein as "de-scaling," instances of compute resources in response to demand.

Web services platform 908 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 10 depicts a computing system diagram that illustrates one configuration for datacenter 902 that implements web services platform 908. With regards to elements of the web services platform 150, previously described with respect to FIG. 1, computer rack A 106A, computer rack B 106B, and computer rack N 106N may each contain one or more of server computer 1002 of FIG. 10 (which itself may be computer 1100 of FIG. 11). Then host partition 208 of FIG. 2 may be an instance of instance manager 1008 (where a host partition serves a hypervisor-type role), and VM instance A 206A, VM instance B 206B, and VM instance N 206N may each be an instance 1006 of FIG. 10. Intranet 110 of FIG. 1 may be local area network 1016 of FIG. 10, and web server 112 of FIG. 1 may be server computer 1004 of FIG. 10.

The example datacenter 902 shown in FIG. 10 may include several server computers 1002A-1002N, which may be referred herein singularly as "server computer 1002" or in the plural as "server computers 1002," for providing compute resources for hosting virtual clouds and for executing applications. Server computers 1002 may be standard tower or rack-mount server computers configured appropriately for providing the compute resources described above. For instance, in one implementation server computers 1002 may be configured to provide instances 1006A-1006N of compute resources.

Instances 1006A-1006N, which may be referred herein singularly as "instance 1006" or in the plural as "instances 1006," may be virtual machine instances. As known in the art, a virtual machine instance is an instance of a software implementation of a machine (i.e., a computer) that executes programs like a physical machine. In the example of virtual machine instances, each server 1002 may be configured to execute an instance manager 1008 capable of executing the instances. Instance manager 1008 may be a hypervisor or another type of program configured to enable the execution of multiple instances 1006 on a single server 1002, for example. As discussed above, each of instances 1006 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 902 shown in FIG. 10 may also include a server computer 1004 reserved for executing software components for managing the operation of datacenter 902, server computers 1002, and instances 1006. In particular, server computer 1004 may execute a management component 1010. As discussed above, working between FIG. 9. and FIG. 10, an entity of web services platform 908 may utilize customer computing system 904 to access management component 1010 to configure various aspects of the operation of web services platform 908 and instances 1006 purchased by the entity. For example, the entity may purchase instances and make changes to the configuration of the instances. The entity may also specify settings regarding how the purchased instances are to be scaled in response to demand. The entity may also provide requests to launch instances to management component 1010.

As also described briefly above, an auto scaling component 1012 may scale instances 1006 based upon rules defined by an entity of web services platform 908. For example, auto scaling component 1012 may allow an entity to specify scale up rules for use in determining when new instances should be instantiated and scale down rules for use in determining when existing instances should be terminated.

As discussed briefly above, datacenter 902 may also be configured with a deployment component 1014 to assist entities in the deployment of new instances 1006 of compute resources. Deployment component 1014 may receive a configuration from an entity that includes data describing how new instances 1006 should be configured. For example, the configuration may specify one or more applications that should be installed in new instances 1006, provide scripts and/or other types of code to be executed for configuring new instances 1006, provide cache warming logic specifying how an application cache should be prepared, and other types of information.

Deployment component 1014 may utilize the entity-provided configuration and cache warming logic to configure, prime, and launch new instances 1006. The configuration, cache warming logic, and other information may be specified by an entity using management component 1010 or by providing this information directly to deployment component 1014. Other mechanisms may also be utilized to configure the operation of deployment component 1014.

In the example datacenter 902 shown in FIG. 10, an appropriate LAN 1016 may be utilized to interconnect server computers 1002A-1002N and server computer 1004. LAN 1016 may also be connected to WAN 906 illustrated in FIG. 9. It should be appreciated that the network topology illustrated in FIGS. 9 and 10 has been greatly simplified and that many more networks and networking devices may be utilized to interconnect the various computing systems disclosed herein. Appropriate load balancing devices or software modules may also be utilized for balancing a load between each of datacenters 902A-902N, between each of server computers 1002A-1002N in each datacenter 902, and between instances 1006 purchased by each entity of web services platform 908. These network topologies and devices should be apparent to those skilled in the art.

It should be appreciated that datacenter 902 described in FIG. 10 is merely illustrative and that other implementations may be utilized. In particular, functionality described herein as being performed by management component 1010, auto scaling component 1012, and deployment component 1014 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 11 depicts a computer that may be used in some embodiments, such as the computers depicted in FIG. 1. With regard to the example architecture of FIGS. 1 and 2, customer computer 102, device analyzer A 106A, device analyzer B 106B, web server 112, computer A 204A, computer B 204B, and computer N 204N may each be implemented in an instance of computer 1100 of FIG. 11. Additionally, with regard to FIG. 10, each server computer 1002 and/or 1004 may be implemented in an instance of computer 1100 of FIG. 11.

The computer architecture shown in FIG. 11 illustrates a conventional server computer, workstation, desktop computer, laptop, tablet, network appliance, PDA, e-reader, digital cellular phone, or other computing node, and may be utilized to execute any aspects of the computers described herein, such as to implement the operating procedures of FIGS. 4-8.

Computer 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. CPUs 1104 may be standard programmable processors that perform arithmetic and logical operations necessary for the operation of computer 1100.

CPUs 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 1106 may provide an interface between CPUs 1104 and the remainder of the components and devices on the baseboard. Chipset 1106 may provide an interface to a random access memory (RAM) 1108 used as the main memory in computer 1100. Chipset 1106 may further provide an interface to a computer-readable storage medium, such as a read-only memory (ROM) 1120 or non-volatile RAM (NVRAM) (not shown), for storing basic routines that may help to start up computer 1100 and to transfer information between the various components and devices. ROM 1120 or NVRAM may also store other software components necessary for the operation of computer 1100 in accordance with the embodiments described herein.

Computer 1100 may operate in a networked environment using logical connections to remote computing nodes and computer systems through local area network (LAN) 1116. Chipset 1106 may include functionality for providing network connectivity through a network interface controller (NIC) 1122, such as a gigabit Ethernet adapter. NIC 1122 may be capable of connecting the computer 1100 to other computing nodes over LAN 1116. It should be appreciated that multiple NICs 1122 may be present in computer 1100, connecting the computer to other types of networks and remote computer systems.

Computer 1100 may be connected to a mass storage device 1128 that provides non-volatile storage for the computer. Mass storage device 1128 may store system programs, application programs, other program modules, and data, which have been described in greater detail herein. Mass storage device 1128 may be connected to computer 1100 through a storage controller 1124 connected to chipset 1106. Mass storage device 1128 may consist of one or more physical storage units. Storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 1100 may store data on mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 1128 is characterized as primary or secondary storage and the like.

For example, computer 1100 may store information to mass storage device 1128 by issuing instructions through storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 1100 may further read information from mass storage device 1128 by detecting the physical states or characteristics of one or more particular locations within the physical storage units.

In addition to mass storage device 1128 described above, computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 1128 may store an operating system utilized to control the operation of the computer 1100. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 1128 may store other system or application programs and data utilized by computer 1100, such as management component 1110 and/or the other software components described above.

Mass storage device 1128 or other computer-readable storage media may also be encoded with computer-executable instructions, which, when loaded into computer 1100, transforms the computer from a general-purpose computing system into a special-purpose computer capable of implementing the embodiments described herein. These computer-executable instructions transform computer 1100 by specifying how CPUs 1104 transition between states, as described above. Computer 1100 may have access to computer-readable storage media storing computer-executable instructions, which, when executed by computer 1100, may perform operating procedures depicted in FIGS. 2-5.

Computer 1100 may also include an input/output controller 1132 for receiving and processing input from a number of input devices, such as a keyboard, a mouse, a touchpad, a touch screen, an electronic stylus, or other type of input device. Similarly, input/output controller 1132 may provide output to a display, such as a computer monitor, a flat-panel display, a digital projector, a printer, a plotter, or other type of output device. It will be appreciated that computer 1100 may not include all of the components shown in FIG. 11, may include other components that are not explicitly shown in FIG. 11, or may utilize an architecture completely different than that shown in FIG. 11.

As described herein, a computing node may be a physical computing node, such as computer 1100 of FIG. 11. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for identifying unauthorized devices that connect to a computer network, the system comprising:
   at least one processor; and
   at least one memory bearing instructions that, upon execution by the at least one processor, cause the system at least to:
   monitor a plurality of heterogeneous devices connected to the computer network, the computer network permitting a plurality of users to connect heterogeneous devices to the computer network;
   identify a change to a network configuration of a first device of the plurality of heterogeneous devices connected to the computer network;
   determine whether a second device that has been connected to the computer network is unauthorized to connect to the computer network based at least in part on the identified change to the network configuration of the first device of the plurality of heterogeneous devices connected to the computer network, wherein the second device is unauthorized to connect to the computer network when a Media Access Control (MAC) address of the second device is the same as a MAC address of the first device; and
   in response to determining that the second device is unauthorized to connect to the computer network, store an indication that the second device is unauthorized to connect to the computer network.

2. A method comprising:
   identifying a change to a network configuration relating to a first device of the plurality of heterogeneous devices connected to the computer network;
   determining whether a second device that has been connected to the computer network is unauthorized to connect to the computer network based at least in part on the identified change to the network configuration of the first device of the plurality of heterogeneous devices connected to the computer network, wherein the second device is unauthorized to connect to the computer network when a Media Access Control (MAC) address of the second device is the same as a MAC address of the first device; and in response to determining that the second device is unauthorized to connect to the computer network, store an indication that the second device is unauthorized to connect to the computer network.

3. The method of claim 2, wherein determining whether the second device that has been connected to the computer network is unauthorized to connect to the computer network based at least in part on the identified change to the network configuration of the first device of the plurality of heterogeneous devices comprises:

determining whether a number of devices connected to a switch of a rack of devices of the plurality of devices is above a predetermined threshold number, the second device being connected to the switch.

4. The method of claim 2, wherein determining whether the second device that has been connected to the computer network is unauthorized to connect to the computer network based at least in part on the identified change to the network configuration of the first device of the plurality of heterogeneous devices comprises:

determining whether a type of the second device is the same as a type of the first device, the second device and the first device being connected to a switch of a rack of devices of the plurality of devices.

5. The method of claim 2, wherein determining whether the second device that has been connected to the computer network is unauthorized to connect to the computer network based at least in part on the identified change to the network configuration of the first device of the plurality of heterogeneous devices comprises:

determining whether the second device is connected to a proper layer of a network topology of the computer network.

6. The method of claim 2, wherein determining whether the second device that has been connected to the computer network is unauthorized to connect to the computer network based at least in part on the identified change to the network configuration of the first device of the plurality of heterogeneous devices comprises:

determining whether an identifier of the second device is the same as an identifier of the first device.

7. The method of claim 6, further comprising:

storing an indication that the first device is unauthorized to connect to the computer network.

8. The method of claim 6, wherein storing the indication that the second device is unauthorized to connect to the computer network comprises:

determining that it is more likely that the second device is unauthorized to connect to the computer network than that the first device is unauthorized to connect to the computer network.

9. The method of claim 2, wherein determining whether the second device that has been connected to the computer network is unauthorized to connect to the computer network based at least in part on the identified change to the network configuration of the first device of the plurality of heterogeneous devices comprises:

determining that a characteristic of an actual type of communications link between the second device and a third device of the plurality of devices differs from a characteristic of an expected type of communications link between the second device and the third device.

10. The method of claim 9, wherein the characteristic of the actual type of communications link between the second device and the third device comprises whether the actual type of communications link is half-duplex or full-duplex.

11. The method of claim 9, wherein the characteristic of the actual type of communications link between the second device and the third device comprises a speed of the actual type of communications link.

12. The method of claim 2, wherein determining whether the second device that has been connected to the computer network is unauthorized to connect to the computer network based at least in part on the identified change to the network configuration of the first device of the plurality of heterogeneous devices comprises:

performing a plurality of types of analyses that identify whether the second device is authorized to connect to the computer network, each type of analysis being performed to determine a score; and determining that the second device is unauthorized to connect to the computer network when a combination of the scores of each type of analysis is above a predetermined threshold value.

13. A non-transitory computer-readable storage medium, bearing computer-readable instructions that, upon execution by a computer, cause the computer to perform operations comprising:

identifying a change to a network configuration relating to a first device of the plurality of heterogeneous devices connected to the computer network;

determining whether a second device that has been connected to the computer network is unauthorized to connect to the computer network based at least in part on the identified change to the network configuration of the first device of the plurality of heterogeneous devices connected to the computer network, wherein the second device is unauthorized to connect to the computer network when a Media Access Control (MAC) address of the second device is the same as a MAC address of the first device; and in response to determining that the second device is unauthorized to connect to the computer network, store an indication that the second device is unauthorized to connect to the computer network.

14. The non-transitory computer-readable storage medium of claim 13, further bearing computer-readable instructions that, upon execution by the computer, cause the computer to perform operations comprising:

disconnecting the first device from the computer network.

15. The non-transitory computer-readable storage medium of claim 13, further bearing computer-readable instructions that, upon execution by the computer, cause the computer to perform operations comprising:

alerting an administrator of the computer network that the first device is unauthorized.

16. The non-transitory computer-readable storage medium of claim 13, wherein determining whether the second device that has been connected to the computer network is unauthorized to connect to the computer network based at least in part on the identified change to the network configuration of the first device of the plurality of heterogeneous devices comprises:

determining whether an identifier of the second device is stored by a computing node that maintains a list of identifiers for authorized devices in the computer network.

17. The non-transitory computer-readable storage medium of claim 16, wherein determining whether the identifier of the second device is stored by the computing node that maintains the list of identifiers for authorized devices in the computer network comprises:

after determining that the identifier of the second device is not stored by the computing node that maintains the list of identifier for authorized devices in the computer network, waiting a predetermined amount of time; and after waiting the predetermined amount of time, again determining whether the identifier address of the second device is stored by the computing node.

18. The non-transitory computer-readable storage medium of claim 13, wherein determining whether the second device that has been connected to the computer network is unauthorized to connect to the computer network based at least in part on the identified change to the network configuration of the first device of the plurality of heterogeneous devices comprises:

determining that the second device is connected to the computer network in a proper place for the second device.

19. The non-transitory computer-readable storage medium of claim 13, wherein the second device comprises a computing node, a virtual machine (VM) instance, a switch, a router, a hub, a firewall device, or a load balancer.

* * * * *